T. HYATT,
Assignor to E. A. L. HYATT.
Illuminating Roof Grating and Surfaces constructed therefrom.
No. 9,535. Reissued Jan. 11, 1881.
FIG. I.
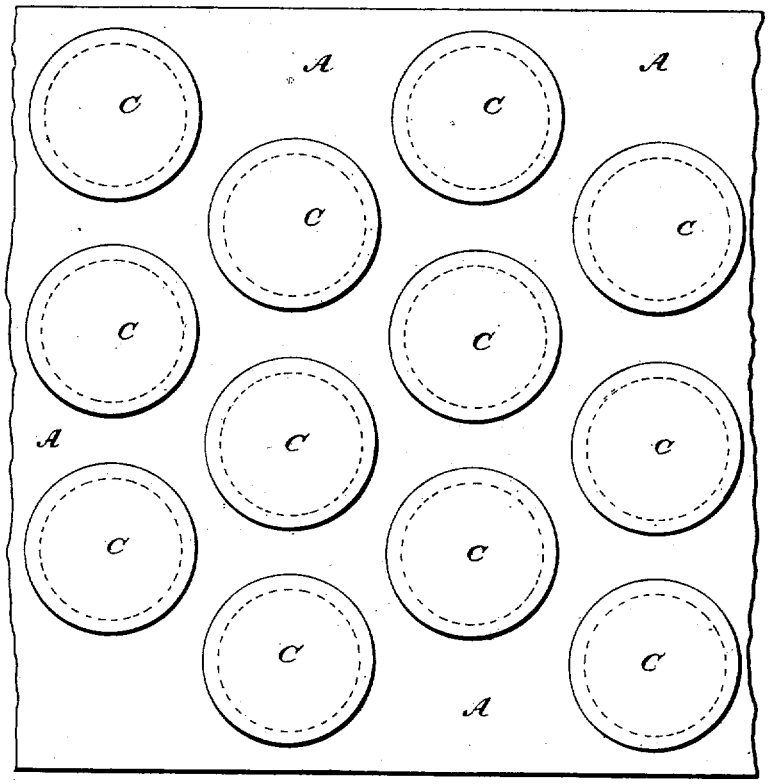
FIG. II.
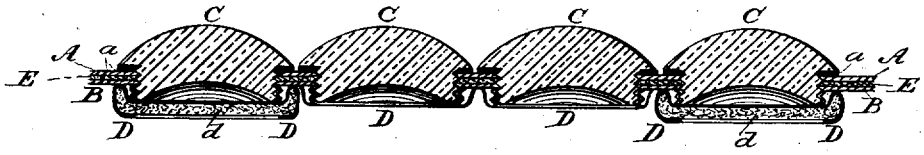
Thaddeus Hyatt
WITNESSES:
Geo. W. Woodward
R. Moore
INVENTOR:
N. PETERS, PHOTO-LITHOGRAPHER, WASHINGTON, D. C.

UNITED STATES PATENT OFFICE.

THADDEUS HYATT, OF NEW YORK, N. Y., ASSIGNOR TO ELIZABETH A. L. HYATT, OF SAME PLACE.

ILLUMINATING ROOF-GRATING AND SURFACES CONSTRUCTED THEREFROM.

SPECIFICATION forming part of Reissued Letters Patent No. 9,535, dated January 11, 1881.

Original No. 145,206, dated December 2, 1873. Application for reissue filed December 21, 1880.

*To all whom it may concern:*

Be it known that I, THADDEUS HYATT, of the city, county, and State of New York, have invented certain new and useful Improvements in Illuminating Roof-Gratings and Surfaces Constructed therefrom, as set forth in the following specification, the drawings attached hereto making part of the same.

Illuminating grating-roofs as commonly made present a large surface of metal to be affected by changes of temperature, the consequence of which is that in winter, when the external air is bitterly cold and the atmosphere within is at summer heat, a large amount of moisture is condensed against the under side of the roof, to the great discomfort and annoyance of the shop-keepers doing business underneath it.

The object of my invention is to meet this difficulty and produce a roof that will not sweat.

Figure I is a plan view of the upper side of a section of an illuminating-grating or roofing-plate of my improved construction, and Fig. II is a vertical section of the same.

Letters of like name and kind refer to like parts in each of the figures, the figures representing a section of a roof or part of a roof.

In the annexed drawings, A represents a metal plate made, preferably, in some cases thin and flexible, and covered upon its lower surface with a sheathing of wood, B, which latter is also thin and easily bent. At suitable points upon the plate A are provided illuminating-openings *a*, each of which contains a glass, C, that has preferably an enlarged head and threaded shank, and is held in place by means of a nut, D, which engages with said threaded shank and bears against the lower surface of the wooden sheathing, so as to confine the latter closely upon said plate A. The wooden sheathing, being a non-conductor of heat and cold, prevents the condensation of moisture upon the lower side of the plate A during sudden changes in the temperature of the external air.

If desired, the capacity of the sheathed grating to resist the transmission of heat and cold may be materially increased by placing between the plate A and wooden sheathing B a lining of felt or other fibrous material, E.

A certain amount of moisture will condense upon the lower side of each lens C, and in order that the same may be prevented from dripping downward I make the lower surface of each lens concave, so as to cause said moisture to pass outward and downward to the edge thereof, and within the lower side and inner edge of each nut I provide an annular groove or recess, that is filled with felt or other absorbent material *d*, which felt absorbs the said drip and causes the same to be diffused through its whole body and brought into such contact with the air as to cause it to become dissipated therein.

In case the lens is constructed so as to be secured in place without the use of the nut D, (as would be the case were the metal sheet A provided with rings to hold the glass, or were the plate A made of cast-iron formed with seats, as shown in my English patent, No. 2,788, 1873,) the felt may be attached to or upon the wood casing at the edge of each illuminating-opening, where it will perform the same office, as before described.

I have herein described my invention as made by means of a non-conducting material applied to the under side of the roof, because of its twofold character in that position—viz., as a non-conductor and also as a finish and ornamentation to the ceiling-face of the same, saving, also, the expense of paint, frequently applied, to cover up discolorations on the naked metal; but it is evident that, so far as preventing condensation, the sheathing of wood or equivalent material would be equally efficacious if applied to the weather-surface of the roof. I would further observe that by the term "roof," as herein used and meant to be understood, I mean to describe the roofs of houses not designed for being walked upon, such as the top roofs of buildings and the roofs over rear extensions on the ground floor or principal story of a building. I also mean by the term "roof" and "roofing-plate" to represent something more than a vault-cover or coal-hole plate—to wit, a roof-pavement—the wood sheathing herein described being intended to represent a complete sheathing over the entire under surface of a roof formed of such sheathed plates, the design being to make an illuminating-roof not open to the objection of sweating at any part of its surface. The laminæ of wood described and illustrated in my original vault-cover patent of 1845 partially prevented the under face of the cover from sweating. So, also, with the asphalted beam-platform described in my British patent, No. 2,869, October 2, 1869; but the non-slipping walking-surface therein described was not necessarily a complete non-sweating roof to any greater proportionate extent than was the old 1845 vault-cover a complete non-sweating vault-cover, neither is it so described in the patent. If constructed of asphalted tiles, in dish shape, the naked iron rims bordering each asphalted plate composing the roof would destroy the completeness of the non-sweating under surface.

The invention was not patented in England by me as a completed invention until August 23, 1873, by Patent No. 2,788, that patent fully setting forth the invention as herein described, and illustrated by my drawings. The same invention is also illustrated in fact, if not by name, as described in my English Patent No. 3,380, October 18, 1873, where the roof is represented as constructed of hexagonal-shaped cells or quarries set with glasses, so combined each to the other as to produce by this union of cells a complete honey-comb structure, the entire roof being in itself sufficiently rigid and strong to need no rafters or supports of any kind. Besides being made of naked metal cells set with glass, these roofs are also described as made of fire-proof cells manufactured from concrete, cement, or baked clays, materials that of necessity also make the structure non-condensing, an illuminating metal-grating roof overlaid by concrete between the glasses being equally non-condensing with one overlaid by wood or asphalt.

Having thus traced and described the growth and development of my invention, in order to render plain the exact nature and extent of the thing now sought to be patented, and for the purpose of distinguishing it from all other inventions of similar kind, and having also fully described and illustrated the same,

What I claim, and desire to secure by Letters Patent, is—

An illuminating-grating or perforated metal roof made non-condensing on its under side by means of a lining, facing, or covering of non-conducting material applied to the metal parts composing the roof, substantially as and for the purposes herein set forth, and illustrated by my drawings.

THADDEUS HYATT.

Witnesses:
GEO. M. LOCKWOOD,
A. MOORE.